(12) United States Patent
Hollman

(10) Patent No.: US 6,487,827 B2
(45) Date of Patent: Dec. 3, 2002

(54) VENEERED RAISED PANEL ELEMENT AND METHOD OF MANUFACTURING THEREOF

(75) Inventor: Joe Hollman, Irving, TX (US)

(73) Assignee: Hollman Inc., Irving, TX (US)

( * ) Notice: Subject to any disclaimer, the term of this patent is extended or adjusted under 35 U.S.C. 154(b) by 56 days.

(21) Appl. No.: 09/751,969

(22) Filed: Dec. 29, 2000

(65) Prior Publication Data

US 2002/0083649 A1 Jul. 4, 2002

(51) Int. Cl.[7] ............................... E06B 3/70
(52) U.S. Cl. ..................... 52/455; 2/69; 264/118; 52/311.1; 52/309.9; 144/371
(58) Field of Search .................. 312/204, 265.5; 52/784.1, 800.11, 800.1, 802.1, 802.11, 782.2, 782.21

(56) References Cited

U.S. PATENT DOCUMENTS

| | | | |
|---|---|---|---|
| 4,275,027 A | * 6/1981 | Luck et al. | 264/118 |
| 4,702,054 A | * 10/1987 | Turner | 144/371 |
| 4,812,188 A | 3/1989 | Hansen | 156/245 |
| 5,312,504 A | 5/1994 | Jorde | 156/258 |
| 5,526,857 A | 6/1996 | Forman | 144/346 |
| 5,950,382 A | * 9/1999 | Martino | 52/311.1 |
| 5,956,767 A | * 9/1999 | Imm | 2/69 |
| 6,073,419 A | * 6/2000 | Moyes | 52/309.9 |

* cited by examiner

Primary Examiner—Carl D. Friedman
Assistant Examiner—Steve Varner
(74) Attorney, Agent, or Firm—Slater & Matsil, LLP

(57) ABSTRACT

The present invention relates to veneered paneled elements such as doors. For example, a veneered raised panel door could include two vertically-oriented framing members (e.g., stiles) and two horizontally-oriented framing members (e.g., rails). These members are combined with a center panel to create a door frame. Each exposed edge of the door is layered with an edge banding. This edge banding (e.g., a wood or plastic veneer) covers any joints between the vertically-oriented and horizontally oriented framing members.

55 Claims, 6 Drawing Sheets

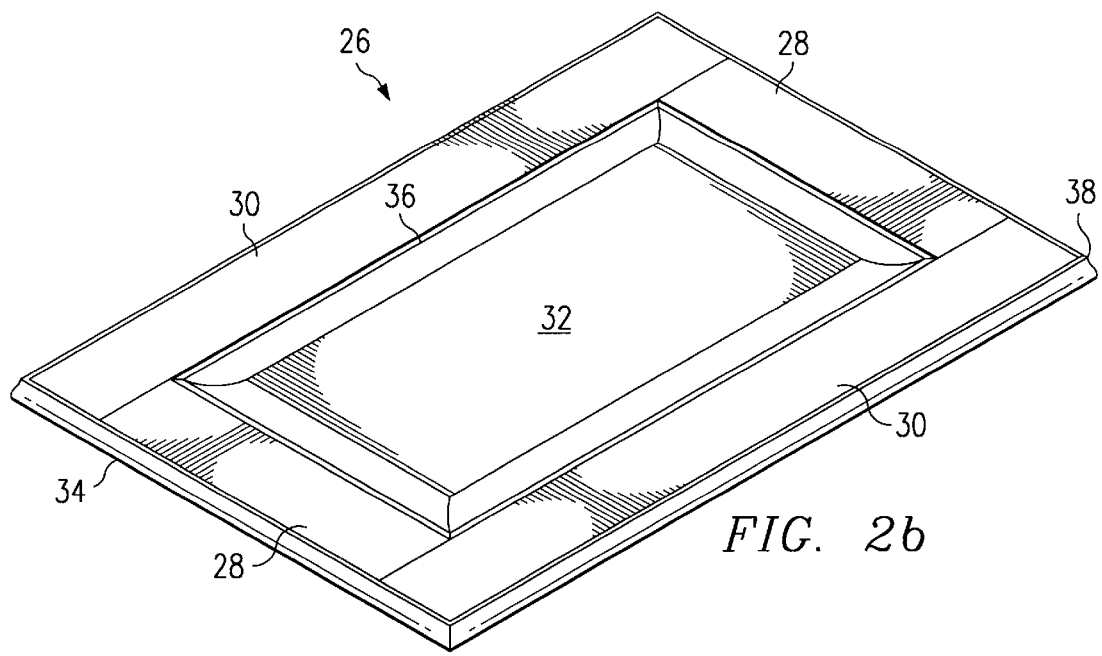
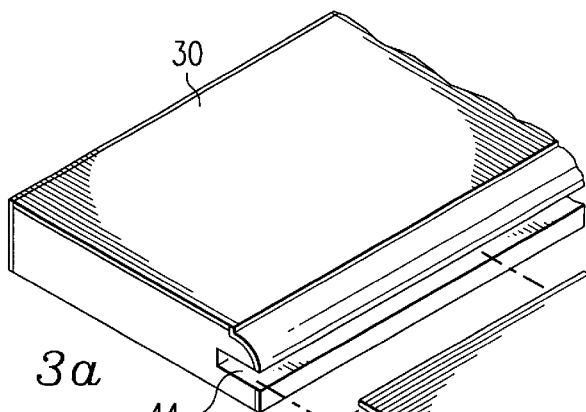
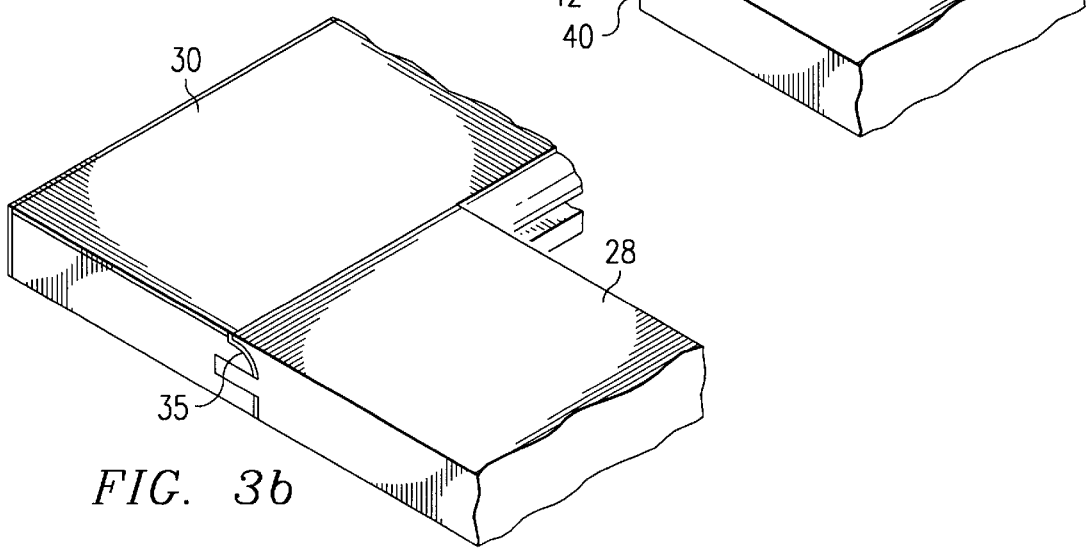

US 6,487,827 B2

VENEERED RAISED PANEL ELEMENT AND METHOD OF MANUFACTURING THEREOF

TECHNICAL FIELD

The invention relates generally to the manufacture of elements such as doors and more particularly to a veneered raised panel element such as a door and method of manufacturing thereof.

BACKGROUND

Raised panel doors have been a part of the building and cabinet industries for many years. As shown in FIG. 1, a raised panel door 10 generally includes five components: two rails 12, two stiles 14, and a center panel 16. When the rails 12 and stiles 14 are assembled, the resulting structure is the outer frame 22 of door 10. The rails 12 form the horizontal portions of the door 10 and the stiles 14 form the vertical portions of door 10.

During manufacture, the rails 12 and stiles 14 may be processed by a machine, such as a soft former (not shown), which machines grooves on the inside edges 18 of stiles 14 and rails 12 while a double-end tennoner machines a cope on the ends of rails 12. The copes on rails 12 fit into the patterns comprising grooves on stiles 14 for connecting the two components together. Glue may then be applied to the intersecting portions of the stiles and rails, and the pieces assembled together as a frame around center panel 16. The center panel 16, as well as the stiles 14 and rails 12, are traditionally held in place with staples (not shown) to provide strength while the glue cures. Although machines may be used to perform some of the processes used in forming raised panel door 10, many processes are performed by humans, resulting in a labor-intensive and expensive manufacturing process.

For many years, each of the five components of the raised panel door 10 was made of solid wood materials, which may be quite costly and often lack uniformity in color and grain patterns. With the invention of the vacuum press, however, the industry has moved to manufacturing raised panel doors 10 in which the center panel 16 is made of a veneered panel. Such technology has enabled manufacturers to press and bend veneer over the gently sloping surface of a core material, making the. manufacturing of the door more cost effective. These doors are still labor intensive and costly, however, because the rails 12 and stiles 14 are still manufactured out of solid wood materials.

Manufacturing raised panel doors 10 with solid wood materials has resulted in disadvantages that affect the manufacturing process, the consumer, and the environment. One disadvantage of raised panel doors 10 utilizing solid wood materials is the amount of wood that is required during manufacturing. It is increasingly becoming more difficult to obtain solid stock without blemishes such as knots and which has consistent color. These characteristics are undesirable to manufacturers because they compromise the high quality door desired by consumers. The scarcity of wood stock possessing desirable characteristics is further exacerbated as this stock has become scarcer due to the stock being sold for veneers and at a higher price. Thus, generally the only material left for stiles and rails on raised panel doors 10 is stock that is rejected for veneers. An entire manufacturing process may be needed to provide acceptable wood for the stiles and rails, and much of the original wood stock (e.g., 50–60%) may be wasted in the process.

Although the manufacturing of the center panel 16 out of a veneered substrate has alleviated some of the effects of wood shortages, other problems arise from the incorporation of different products into a single raised panel door 10. First, the veneered center panel 16 of the door 10 may stain to different color than the solid wood stiles and rails. Secondly, the veneered center panel 16 may have a more uniform pattern than the rails 12 and stiles 14 because of the different wood stock used for the veneer and for the solid wood rails 12 and stiles 14. As explained above, the veneer will generally be of a better quality wood stock. Thirdly, the door 10 has a tendency to expand and contract more because of the solid wood materials used in the manufacturing of the stiles and rails. This necessitates the need to staple the center panel into position to allow for the relative movement between the different pieces.

Stapling also results in unsightly staple holes for the manufacturer to fill and evidence of the staple may still be seen in the finished product. Warping of the solid wood pieces may also occur. Furthermore, the assembled door 10 results in a product in which the seams of the cope and groove 20 may be seen along the outer edges of the door 10. In addition, the ends of stiles 14 next to the cope of rails 12 exposes the cross grain of the wood, which does not match and is not as aesthetically pleasing as the wood on the side of the adjacent rails. Also, the end grain generally allows a faster rate of moisture absorption than the edge grain, thereby increasing the risk of warping and instability.

SUMMARY OF THE INVENTION

These and other problems are generally solved or circumvented, and technical advantages are generally achieved by preferred embodiments of the present invention. In one preferred embodiment, the raised panel door comprises at least two vertically-oriented framing members, each vertically-oriented framing member having a cavity within the framing member along a first of two elongated sides forming a top edge and a bottom edge and having a first pattern profile along the top edge. The door also comprises at least two horizontally-oriented framing members disposed between the at least two vertically-oriented framing members, each horizontally-oriented framing member having a cope at each of two horizontal ends which is shaped to fit within the cavity of the vertically-oriented framing members to form a door frame, and having a second pattern profile along one of two vertical ends, the second pattern profile designed to tranversely align with the first profile to form a consistent pattern profile around the door frame. A center panel is disposed within the door frame. Edge banding is applied to each of the outer edges. Each of the at least two vertically-oriented members, at least two horizontally-oriented members, and center panel comprise a veneered layered substrate.

In accordance with another preferred embodiment of the present invention, a method for making a door comprises forming pieces of a substrate into at least two vertically-oriented members having a cavity within the vertically-oriented members, at least two horizontally-oriented members having a cope at each of two vertical ends, the cope designed to fit within the cavity of each of the vertically oriented members, and a center panel, each member having profiled inner edges and outer edges; assembling the members together to form the door utilizing the cavity of the vertically-oriented members, the cope of the horizontally-oriented members, and applicable glue; and edge banding the outer edges of the door with an edge band such as veneer or a plastic band.

In another preferred embodiment method, the forming of the members comprises machining strips of veneer covered substrate to the proper size for forming each of the members, forming the cavity and a pattern profile on the at least two vertically-oriented members, forming the cavity, cope and the pattern on the at least two horizontally-oriented members, and veneering the pattern profile on each of the at least two vertically-oriented members and each of the at least two horizontally-oriented members.

In accordance with another preferred embodiment of the present invention, a cabinet having the inventive door of the present invention comprises a housing and a raised panel door comprising veneer and attached to a side of the housing, the raised panel door having at least two horizontally-oriented framing members disposed between two vertically-oriented framing members to form a door frame, and having a center panel disposed within the door frame, each exposed edge of the door having edge banding applied to the exposed edge.

An advantage of a preferred embodiment of the present invention is the avoidance of costly solid wood materials requiring costly and labor intensive manufacturing, and the decrease in the amount of wood stock taken from the environment.

Another advantage of a preferred embodiment of the present invention is that a less costly, high quality raised panel door may be offered to the consumer.

A further advantage of a preferred embodiment of the present invention is a more aesthetically pleasing raised panel door, with uniform staining, decreased warping, and better uniformity of appearance due to elimination of staples and visible cope and groove seams.

Yet another advantage of a preferred embodiment of the present invention is improved structural stability and strength of the door through the use of edge banding across the cope and groove joints between the stiles and rails.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIGS. 2a and 2b are isometric views of preferred embodiment raised panel doors;

FIGS. 3a, 3b, and 3c illustrate a preferred embodiment stile and rail;

DETAILED DESCRIPTION OF THE PREFERRED EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
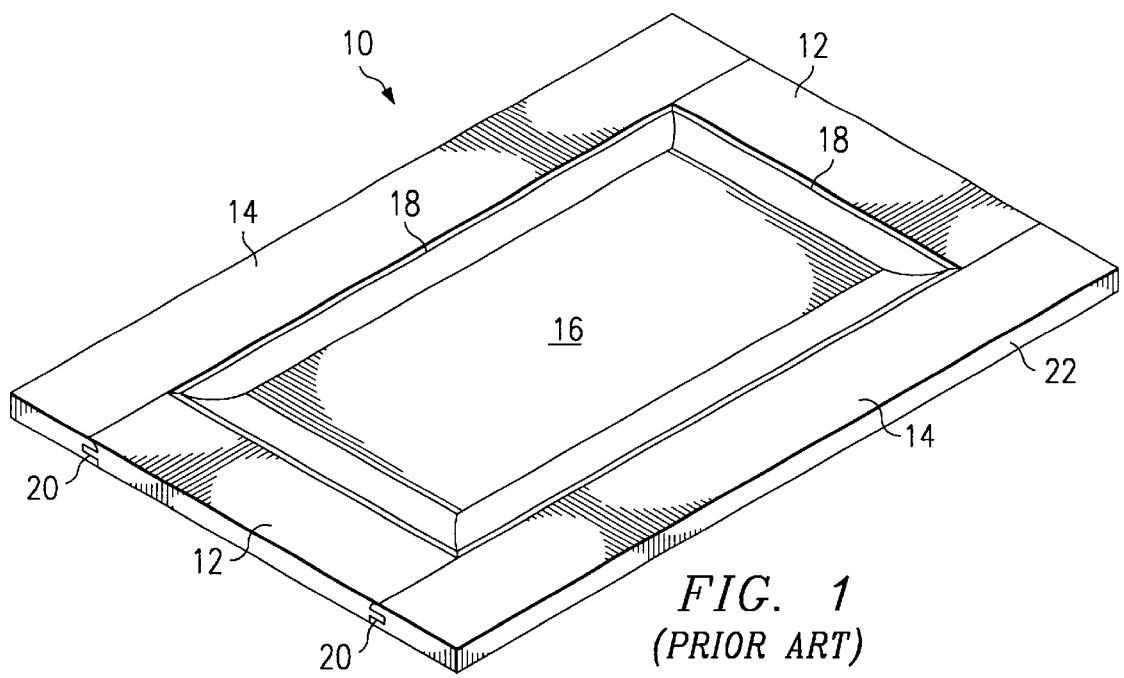
FIG. 1 is an isometric view of a prior art raised panel door.
Figure 2A:
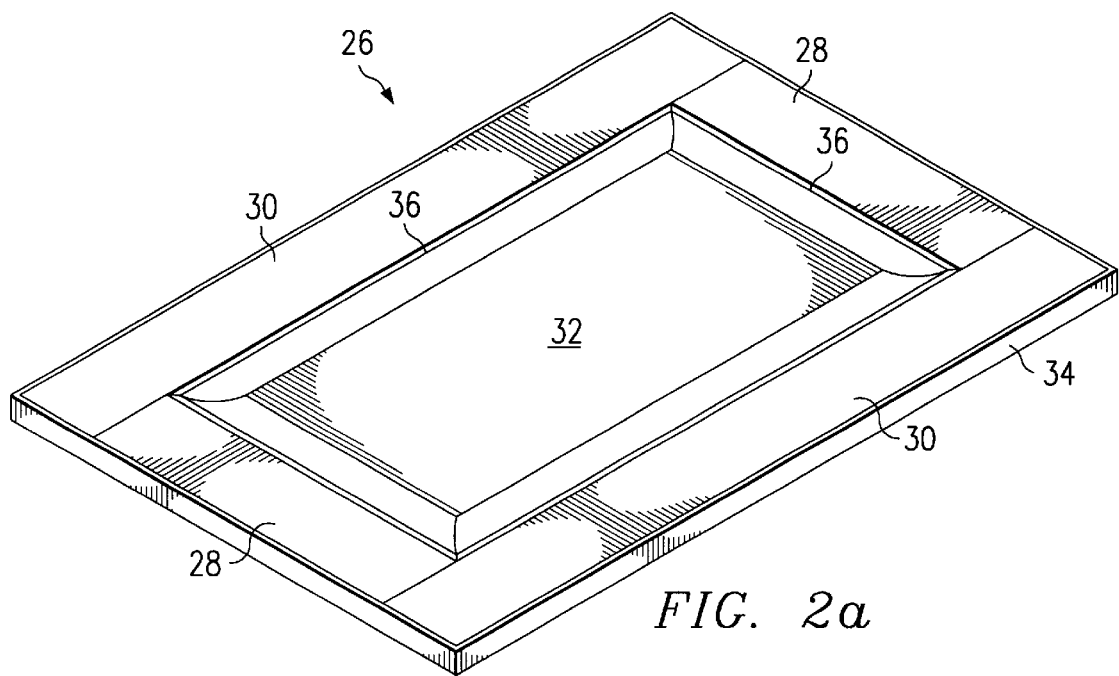

With reference now to FIGS. 2a and 2b, there are shown isometric views of preferred embodiment raised panel doors 26. The door 26 comprises horizontally-oriented members or rails 28, vertically-oriented members or stiles 30, a center panel 32, and edge banding 34. The rails 28, stiles 30, and center panel 32 are comprised of a wood veneer laid over a manufactured material such as pressed wood, medium density fiberboard (MDF), particleboard, chip board, or some other engineered core material. The rails 28 and stiles 30 each contain an inner edge 36 which may be a simple or pattern profile. The outer edge 38 of the rails 28 and stiles 30 may also be a simple edge such as a squared edge as shown in FIG. 2a or a pattern profile as shown in FIG. 2b. The two components rails 28 and stiles 30 have interlocking members which connect the components together.

Figure 3C:
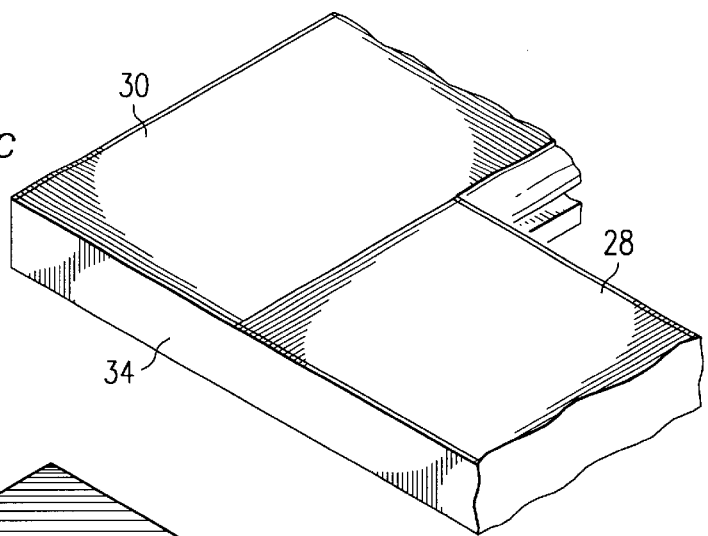

The interlocking members may form a traditional cope and pattern door joint where the rails 28 are mated to the stiles 30. For simplicity, the cope and pattern joint are illustrated in FIGS. 3a, 3b and 3c with one end of one rail 28 and one end of one stile 30. It should be appreciated, however, that the cope and joint pattern exists at each of four intersections of stiles 30 and rails 28.

As shown in FIG. 3a, the rails 28 comprise coped edges 40 from which a protruding member 42 extends perpendicularly from the edge 40. The protruding member 42 is shaped and sized to fit within a cavity 44 which is formed within and along the length L of the stiles 30. When the protruding member 40 is fully seated in the cavity 44, the stiles 30 and rails 28 are joined together in a final fit of the door 26 as shown in FIG. 3b.

The edge banding 34, as shown in FIG. 3c, is preferably located on all the exposed outer edges of the finished door 26. The edge banding 34 preferably comprises any suitable material that conforms to the requirements of softforming, such as a wood veneer or a plastic material, but may also be made of a more substantial piece of material such as solid wood.

Several advantages are incurred using edge banding 34. The strength and stability of the door 26 is substantially increased over that of prior art doors because all of the edges of the door 26, including joint seams 35, are supported with the edge banding 34. In addition, edge banding 34 gives the completed door 26 the aesthetically pleasing appearance of a solid wood profile showing no joint seams 35. Furthermore, the exposed edges 36 and 38 of the door 26, which may be nicked or scratched in using door 26, are protected, thus extending the life of the door 26 as well as improving the appearance of the door 26. Also, there is a significant savings in cost and materials as approximately 32 to 40 slices, for example, of veneer may be processed out of one inch of solid wood material.

Figure 8:
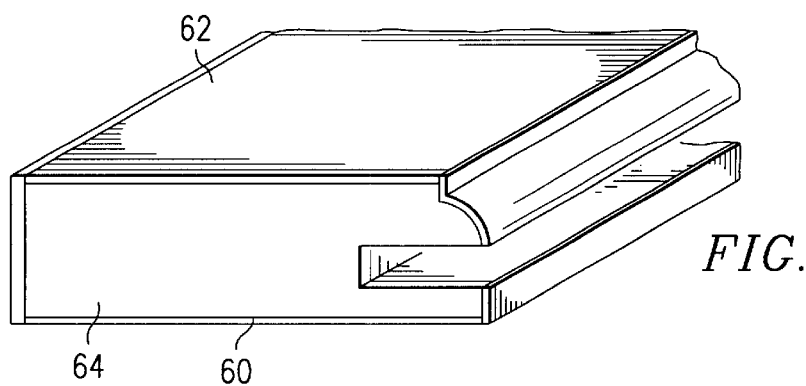
FIG. 8 is an isometric cross-section view of a stile or rail.

As shown in FIG. 3a, the upper surface of both stile 30 and rail 28 are preferably covered with a veneer material. This veneer is applied in any suitable manner known in the art. In the preferred embodiment of manufacturing the door, the veneer is applied beforehand so that the starting material includes veneer on the major surfaces. The veneer preferably covers the bottom surface of stile 30 and rail 28 opposite the upper surface. This can be seen in FIG. 8, which shows veneer 60 on the bottom major surface and veneer 62 on the upper major surface of engineered substrate 64.

Figure 4:
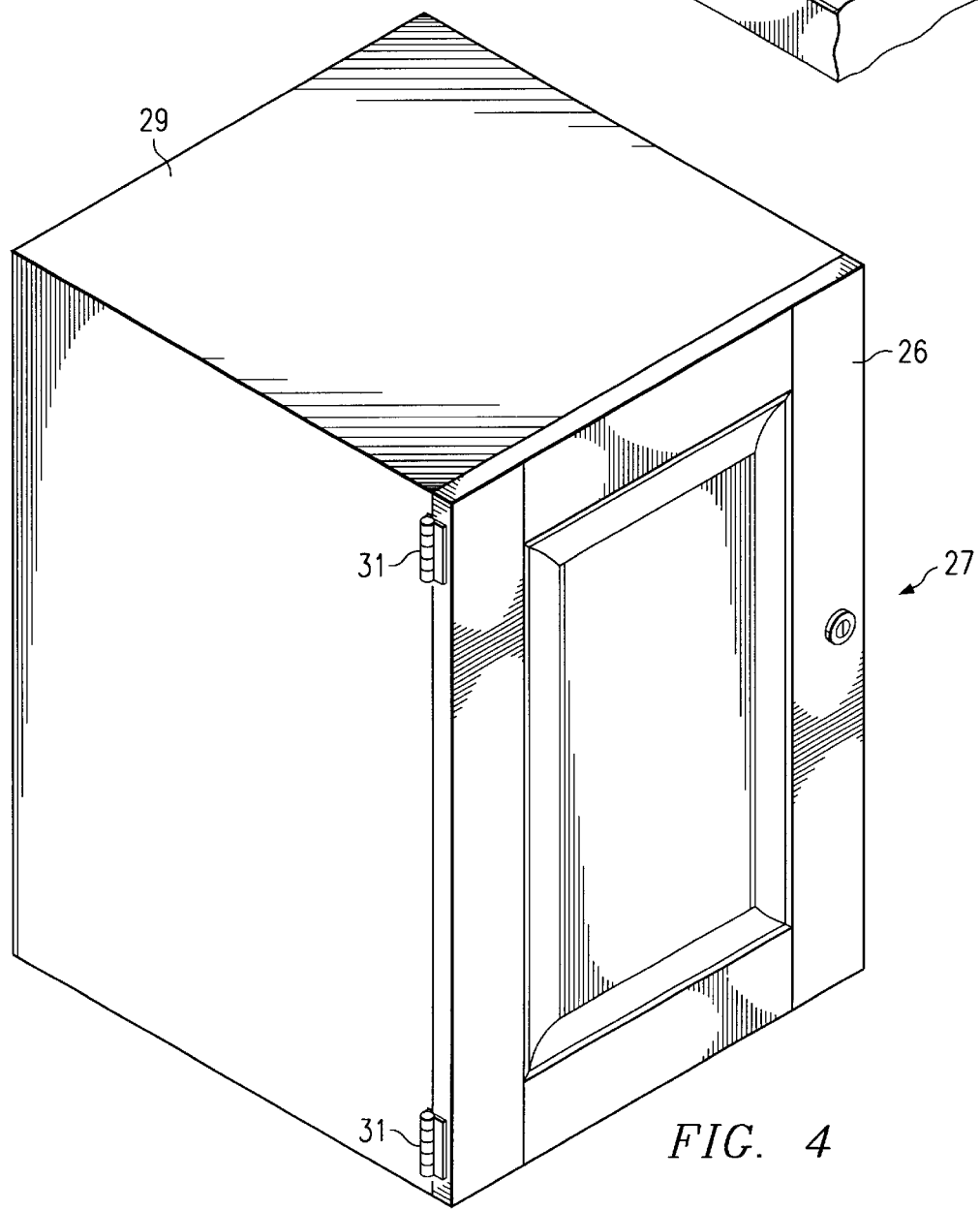
FIG. 4 illustrates a preferred embodiment cabinet comprising a raised panel door.

The raised panel door 26 can be used in many structures including, as examples, residential and commercial cabinets, which is used herein to include lockers and other similar case goods. A cabinet 27 having the raised panel door 26 is shown in FIG. 4. The cabinet 27 comprises a housing 29 and the wood veneered raised panel door 26 and attached to the housing 29 (e.g., by hinges 31) to form a closed structure. The raised panel door 26 can be designed and stained to coordinate with the style, color, size, and shape of the housing 29. In another preferred embodiment, other portions of the cabinet, such as the sides, back, top or bottom, may also be made from a raised panel element. An element may also be formed such that a raised panel and pattern appears on both sides of the element. In addition, a raised panel element may comprise multiple raised panels and the appropriate number of stiles and rails to frame the multiple raised panels. For example, an element with two raised panels may have two stiles and three rails, and so on.

A method of manufacturing the veneered raised panel door 26 comprises forming pieces of a substrate into the rails 28, the stiles 30, and the center panel 32, forming pattern profiles on the inside edges of the stiles and rails, veneering the pattern profiles, assembling the stiles 30, rails 28, and center panel 32 together to form the door 26, and edge banding the outer edges 38 of the door 26.

Figure 5:
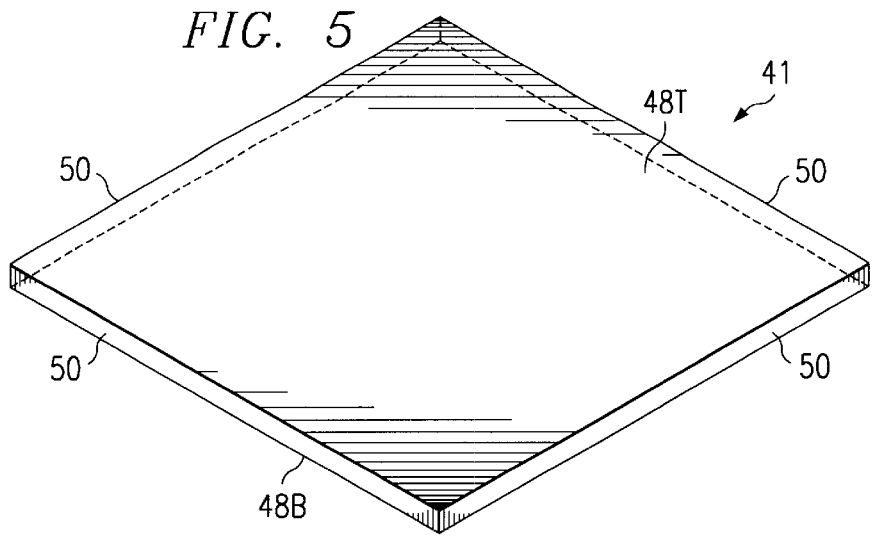
FIG. 5 illustrates the substrate material used in a preferred embodiment.

Referring to FIG. 5, stiles 30, rails 28, and center panel 32 can each be formed from a substrate 41 of a material such as MDF, particleboard, chipboard, plastic, or some other engineered core material. As discussed above, the major surfaces 48 (top and bottom) are initially layered with a veneer material, which may be made of any suitable material such as wood or a plastic. The edge surfaces are initially left without veneer. In many instances, this board can be purchased with veneer on the major surfaces.

The substrate 41 is then cut to size to create the stiles, rails and center panels. The size of the various pieces is selected to achieve a particular width stile 30, rail 28, or center panel 32. For example, approximately four inch wide strips are cut to achieve about a 3½ inch wide stile 30 or rail 28. Of course, there is no requirement that the various portions of the door be cut from the same substrate.

The strips are then processed through a machine, for example a soft former, to further process the strips of substrate into finished stiles 30 and rails 28, which are shown in FIG. 3a. The soft former machines a pattern profile on the inside edge of the components, applies glue on the profile (and/or the veneer), puts the veneer on that profile, rolls the veneer tightly on the profile, finishes the edges to make them smooth, and then cuts the groove in the profile for the center panel. Of course, these and other processes described herein may be performed in different orders, and may be performed on one machine or multiple machines.

Figure 9A:
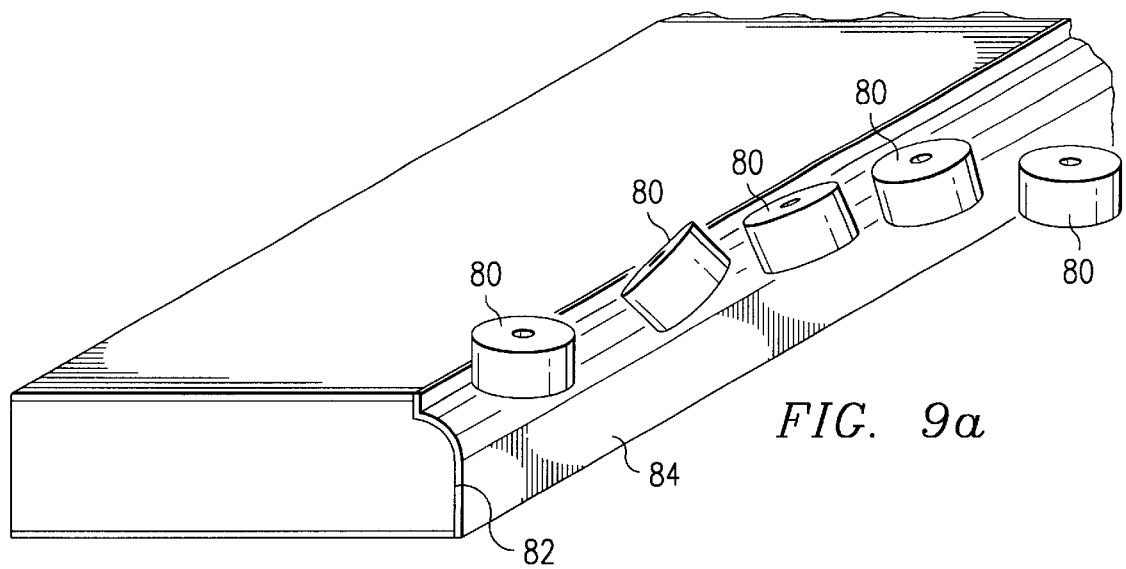
FIGS. 9a and 9b are isometric views of veneer being applied to a pattern profile.
Figure 9B:
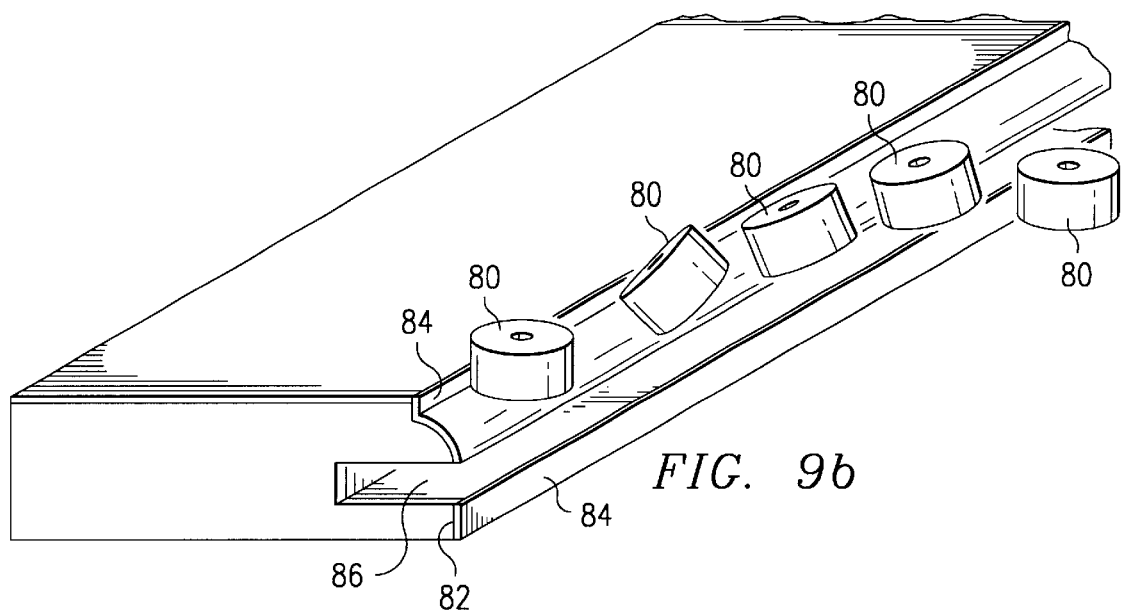

The soft former is computer-controlled and has a plurality of rollers and can be pre-programmed with the information on a variety of different profiles to be used in the pattern profile of the stiles 30 and rails 28, as illustrated in FIGS. 9a and 9b. Rollers 80 are set up to conform the veneer 84 to the pattern 82 formed on the edge of the stiles and rails. The computer-generated pattern profile data may be modified to veneer multiple door types. The plurality of rollers is designed with a cylindrical type armature (not shown). The rollers are also designed to rotate and move along the profile to apply varying pressure to the profile as needed to conform and affix the veneer to the profile. The number of rollers and the angle of the rollers are determined by the profile to be veneered. Surfaces up to about a 90 degree angle or more may be veneered utilizing a preferred embodiment method.

FIG. 9a illustrates a preferred embodiment in which veneer 84 is applied to the pattern profile 82 before the groove is cut into the profile. Alternatively, FIG. 9b illustrates groove 86 cut into the profile before the veneer 84 is applied, although this requires two pieces of veneer. In the preferred embodiment, the veneer glued to the pattern profile is generally about 0.0125 inch thick and has a 50 gram fleeced backing. The thinness of the veneer and fleeced backing gives the veneer added flexibility and facilitates the forming of creases for tight profiles without breaking. In addition, the heat of the hot melt glue further increases the pliability of the veneer. Alternatively, the veneer may have another type of cloth or paper backing that makes the veneer pliable and flexible, and less susceptible to cracking than veneer without such a backing. Alternatively, a different thickness veneer, such as between about 0.001 to 0.1 inches, may be used for the pattern profile depending on the specific application. This veneering process allows the pattern profile formed in an engineered core stile or rail to be covered with a veneer, providing the appearance of a solid wood stile or rail.

A double-end tennoner may be used to form the copes on the ends of the rails, as previously shown in FIG. 3a. The stiles 30, rails 28, and panel 32 are then assembled by gluing the stiles 30 and rails 28 as a frame around center panel 32. Generally, because all pieces are the same or similar core material, the center panel will have a coefficient of expansion similar to that of the frame, and thus the center panel may be glued in place, eliminating the need for staples as in the prior art. The same veneer can be used as the pattern veneer on the inner surfaces of the stiles and rails as that on the stile and rail major surfaces and center panel. Of course, other methods of securing the components to each other may be used.

The outer edges of the stiles 30 and rails 28 may then be edge banded. A thin piece of veneer or edge banding may be applied to the outer edges of the stiles 30 and rails 28 by a computer-controlled machine having rollers generally known as a edge bander. The edge bander may be a single-side edge bander wherein only one side is banded or a double-side edge bander where two sides may be banded simultaneously. It should also be appreciated that an edge-banding system can be used which comprises some combination of the single- and double-side edge banders.

Figure 6:
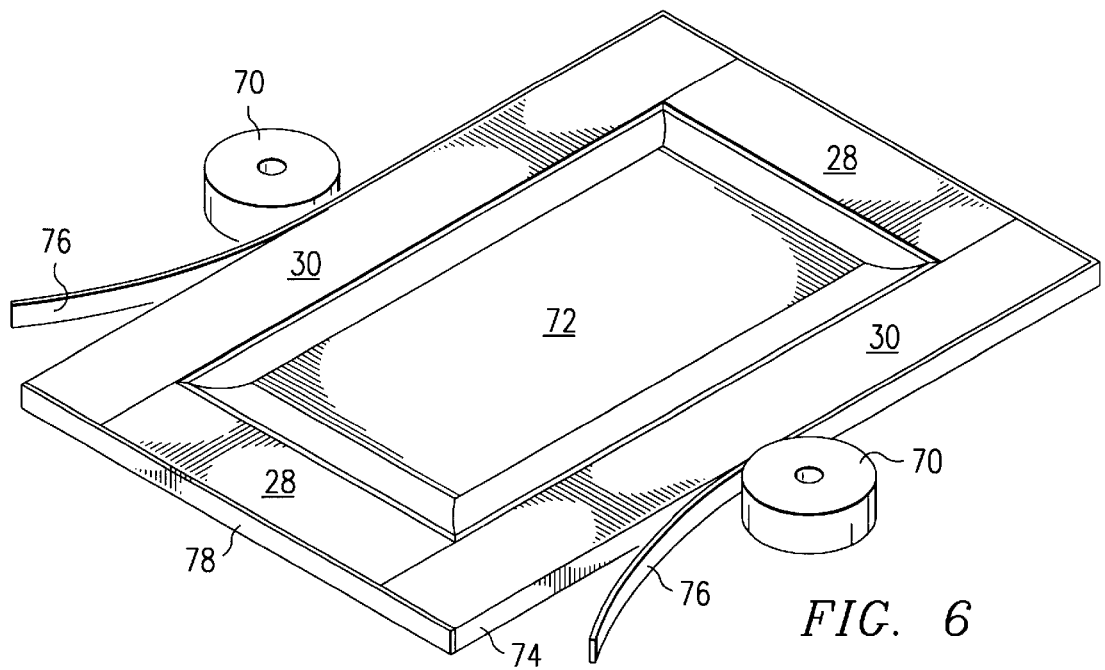
FIG. 6 illustrates an edge bander applying an edge band to the edge of a preferred embodiment raised panel door.

The edge bander is computer-controlled and has a plurality of rollers 70 as shown in FIG. 6. Preferably, door 72 has a straight outside edge 74 to which the rollers 70 apply edge banding 76. Alternatively, the edge bander may be pre-programmed with the information on a variety of different profiles to be used in the edge banding of the stiles 30 and rails 28, as with the pattern profile on the inside edges of the frame. The computer-generated profile data may be modified to band multiple door types. The rollers 70 are designed to rotate and move along the profile to apply varying pressure to the profile as needed to effectively affix the banding to the profile. The number of rollers and the angle of the rollers are determined by the profile to be banded.

Preferably, the rail edges of the door 26 are run through the edge bander before the stiles. First, a portion of the edge is trimmed off, approximately two millimeters off the door 26 to result in a flat profile surface, compensating for any mismatch between the cope and groove joint where the stile and rails meet. A two millimeter edge banding 78 of either plastic or wood is then banded over that surface. This allows a particular door style to be repeatedly manufactured with substantially the same size. This may be repeated for the stile edges of the door.

The edge banding is applied with a hot melt glue and pressed into contact with the rollers. The hot melt glue is any suitable industrial fast clamping glue available on the market. Preferably, the hot melt glue has a clamping time of only a few minutes so as not to hold up the assembly line.

The edge banding 34 to be applied generally has a thickness of about 0.5 mm to about 19 mm. However, the determination of the thickness of the edge banding to be used is dependant on the detail and size of the profile for a particular application. The relationship of the thickness to the size and detail is proportional to the size of the profile and inversely proportional to the detail of the profile, i.e., the smaller and more detailed the profile, the thinner the edge banding should be. This relationship helps prevent the edge banding from cracking or breaking during the application of the edge banding to the component. For some applications, thinner pieces of edge banding are desirable because they require less material and more pieces can be utilized per cubic inch of a veneer sheet.

Figure 7A:
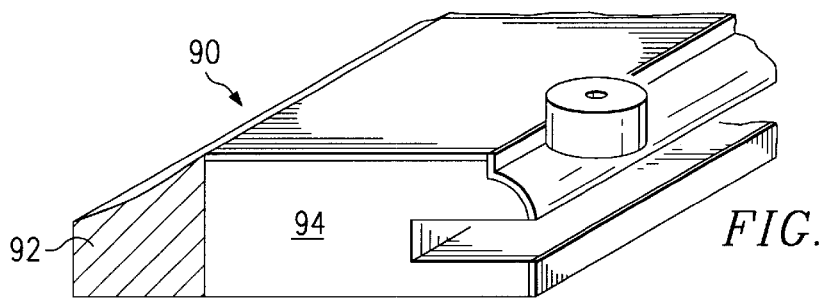
FIGS. 7a through 7d illustrate alternative embodiment edge banding.
Figure 7B:
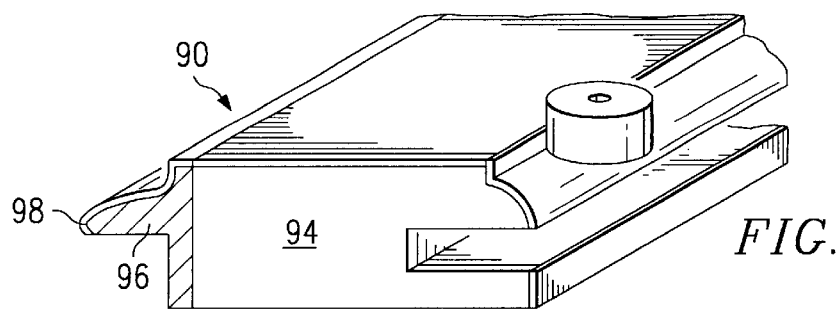
Figure 7C:
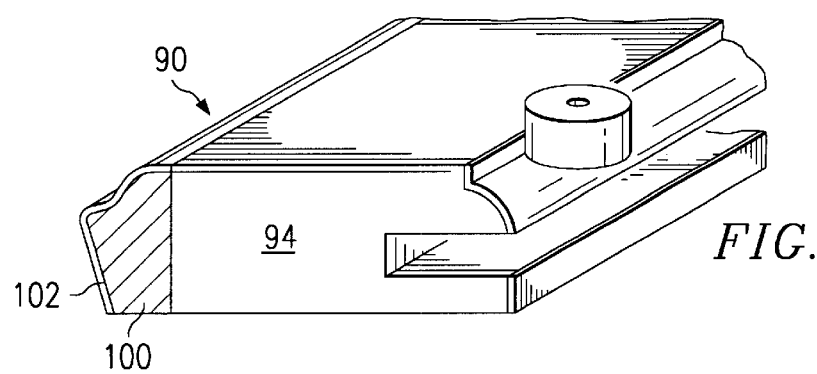
Figure 7D:
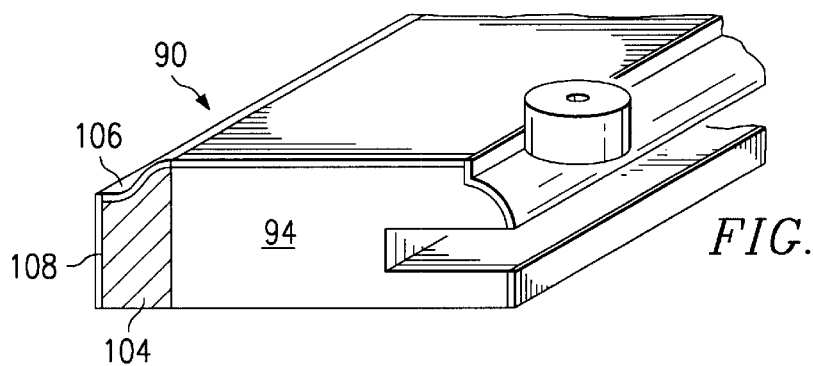

FIGS. 7a through 7d show alternative embodiments for the outside edge 90 of the stiles and rails, which may be used for decorative or functional purposes. These outer edges 90 may be edge banded in the same manner as the pattern profiles, however, the edge banding will be cut at a profiled simple or compound angle (or in a more complicated pattern to accommodate a more complicated profile) to form a profiled joint in the corner of the edge banding. FIG. 7a illustrates a decorative profiled wood or plastic piece 92 glued onto the edge of frame 94, without any edge banding. FIG. 7b illustrates a profiled wood piece 96 glued onto frame 94 and then partially edge banded with edge banding 98. FIG. 7c illustrates a profiled wood piece 100 glued onto frame 94 and then fully edge banded with a single piece of edge banding 102. FIG. 7d illustrates a profiled wood piece 104 glued onto frame 94 and then edge banded with multiple pieces of edge banding 106 and 108.

Figure 10A:
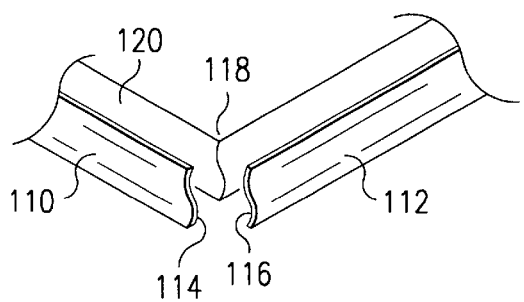
FIGS. 10a and 10b are isometric views of profiled edge banding being applied to a profiled edge of a door.
Figure 10B:
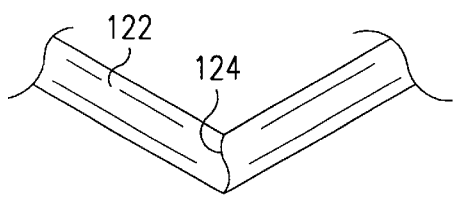

FIG. 10a illustrates edge banding 110 and edge banding 112 which have profiled angle cuts 114 and 116, respectively, to match the profiled corner 118 of door 120. The edge banded door 122 is shown in FIG. 10b with the edge banding conforming to profiled corner 124.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A veneered panel element comprising:
    a center panel;
    a first stile having an inner edge with a first groove attached to a first edge of center panel, major surfaces of the first stile having a veneer finish;
    a second stile having an inner edge with a second groove attached to a second edge of the center panel, the second edge being opposite the first edge, major surfaces of the second stile having a veneer finish;
    a first rail having an inner edge with a third groove attached to a third edge of the center panel, the third edge adjacent to the first and second edges, the first rail also being attached to the first stile at a point near the first edge and to the second stile at a point near the second edge, major surfaces of the first rail having a veneer finish;
    a second rail having an inner edge with a fourth groove attached to a fourth edge of the center panels the fourth edge adjacent to the first and second edges and opposite the third edge, the second rail also being attached to the first stile at a point near the first edge and to the second stile at a point near the second edge, major surfaces of the second rail having a veneer finish; and
    edge banding disposed over outer edges of the first stile, the first rail, the second stile and the second rail, the edge banding disposed across joints between the stiles and the rails.

2. The element of claim 1 wherein the center panel comprises a raised panel.

3. The element of claim 1 wherein:
    the junction between the outer edge and the major surface of the first stile are at a substantially 90 degree angle;
    the junction between the outer edge and the major surface of the second stile are at a substantially 90 degree angle;
    the junction between the outer edge and the major surface of the first rail are at a substantially 90 degree angle; and
    the junction between the outer edge and the major surface of the second rail are at a substantially 90 degree angle.

4. The element of claim 1 wherein the junction between the outer edge and the major surface of the first stile comprises a first profiled surface.

5. The element of claim 4 wherein the junction between the outer edge and the major surface of the first rail comprises a second profiled surface that is transversely aligned with the first profiled surface of the first stile.

6. A veneered panel element comprising:
    a center panel;
    a first stile attached to a first edge of the center panel, major surfaces of the first stile having a veneer finish;
    a second stile attached to a second edge of the center panel, the second edge being opposite the first edge, major surfaces of the second stile having a veneer finish;
    a first rail attached to a third edge of the center panel, the third edge adjacent to the first and second edges, the first rail also being attached to the first stile at a point near the first edge and to the second stile at a point near the second edge, major surfaces of the first rail having a veneer finish;

a second rail attached to a fourth edge of the center panel, the fourth edge adjacent to the first and second edges and opposite the third edge, the second rail also being attached to the first stile at a point near the first edge and to the second stile at a point near the second edge, major surfaces of the second rail having a veneer finish; and edge banding disposed over outer edges of the first stile, the first rail, the second stile and the second rail, the edge banding disposed across joints between the stiles and the rails, wherein the junction between the outer edge and the major surface of the first stile comprises a first profiled surface, wherein the junction between the outer edge and the major surface of the first rail comprises a second profiled surface that is transversely aligned with the first profiled surface of the first stile, and wherein edge banding is cut at a non-right angle at a corner of the first stile.

7. The element of claim 6 wherein the non-right angle is a profiled angle.

8. The element of claim 1 wherein the edge banding is a wood veneer.

9. The element of claim 1 wherein the edge banding comprises a plastic material.

10. The element of claim 1 wherein major surfaces of the center panel have a veneer finish.

11. The element of claim 1 wherein the element comprises a door.

12. The element of claim 11 wherein the element comprises a cabinet panel.

13. The element of claim 1 wherein the first and second stiles, the first and second rails and the center panel each comprise a substrate formed from an engineered core material.

14. The element of claim 13 wherein the engineered core material is selected from the group consisting of medium density fiberboard (MDF), chip board, particleboard, plastic, and combinations thereof.

15. A veneered raised panel element comprising:

at least two vertically-oriented framing members, each vertically-oriented framing member having a first pattern profile formed on the member along a first of two elongated edges, the first pattern profile having a first groove;

at let two horizontally-oriented framing members disposed between the at least two vertically-oriented framing members, each horizontally-oriented framing member having a cope at each of two horizontal ends, each cope shaped to fit within the pattern profile of the vertically-oriented framing members to form a frame, each horizontally-oriented framing member also having a second pattern profile with a second groove formed on the member along one of two vertical ends, the second pattern profile designed to transversely align with the first pattern profile of the vertically oriented framing members;

a center panel disposed within the door frame and secured within the grooves of the vertically-oriented and horizontally oriented framing members; and a veneer edge banding disposed on outer edges of the framing members;

wherein each of the at least two vertically-oriented members, the at least two horizontally-oriented members, and the center panel comprise a core substrate wherein the exposed surfaces of the element are covered with at least one veneer layer.

16. The raised panel element of claim 15 wherein the veneer edge banding is a wood veneer.

17. The raised panel element of claim 15 wherein the veneer overlying a pattern profile in the at least two vertically-oriented members and the at least two horizontally-oriented members next to the center panel includes a fleece backing.

18. The raised panel element of claim 15 wherein the veneer edge banding is a plastic veneer.

19. The raised panel element of claim 15 wherein the veneer edge banding has a thickness in a range of about 0.5 mm to about 19 mm.

20. The raised panel element of claim 15 wherein the non-solid wood substrate comprises a substrate formed from an engineered core material.

21. The raised panel element of claim 20, wherein the engineered core material is selected from the group consisting of medium density fiberboard (MDF), chip board, particleboard, plastic, and combinations thereof.

22. The raised panel element of claim 15 wherein the element comprises a raised panel door.

23. The raised panel element of claim 15 wherein the at least two vertically oriented members each include a profiled outer surface, at least a portion of the profiled outer surface being layered with veneer layer having ends cut at a profiled angle.

24. A cabinet having a raised panel door comprising:

a housing; and a veneered raised panel door attached to the housing, the raised panel door having at least two horizontally-oriented framing members disposed between two vertically-oriented framing members to form a door frame, the door frame having an inner edge with a groove, and having a center panel disposed within the groove of the door frame, wherein outer edges of the door have edge banding applied to the outer edges and across edge joints formed between adjoining ones of the framing members, and a pattern profile in the at least two vertically-oriented members and the at least two horizontally-oriented members, wherein the patter profile is covered with a veneer.

25. The cabinet of claim 24 wherein the edge banding is a wood veneer.

26. The cabinet of claim 24 wherein the edge banding comprises a plastic material.

27. The cabinet of claim 24 wherein the edge banding comprises a solid wood material.

28. A cabinet having a raised panel door comprising:

a housing; and a veneered raised panel door attached to the housing, the raised panel door having at lest two horizontally-oriented framing members disposed between two vertically-oriented framing members to form a door frame, and having a center panel disposed within the door frame, wherein outer edges of the door have edge banding applied to the outer edges and across edge joints formed between adjoining ones of the framing members, and a pattern profile in the at least two vertically-oriented members and the at least two horizontally-oriented members, wherein the pattern profile is covered with a veneer, and wherein the veneer covering the pattern profile includes a fleece backing.

29. The cabinet of claim 24 wherein the edge banding has a thickness in a range of about 0.5 mm to about 19 mm.

30. The cabinet of claim 24 wherein the exposed outer edges have a profile, and the edge banding is cut at a profiled angle to facilitate the banding of the profiled exposed outer edges.

31. The cabinet of claim 24 wherein the two vertically-oriented members and the two horizontally-oriented members each include a substrate formed from an engineered core material.

32. The cabinet of claim 31 wherein the engineered core material is selected from the group consisting of medium density fiberboard (MDF), chip board, particleboard, plastic, and combinations thereof.

33. A method of manufacturing a raised panel door having at least two vertically-oriented members, at least two horizontally-oriented members, and a center panel, the method comprising:
providing two vertically-oriented members, each having a pattern along an inner edge, the two vertically-oriented members including an engineered substrate;
providing two horizontally-oriented members, each having a cope at each of two horizontal ends, the cope designed to fit within the pattern of a corresponding one of the vertically oriented members, the two horizontally-oriented members including an engineered substrate;
assembling the two vertically-oriented members, the two horizontally-oriented members and a center panel to form the door; and
edge banding the outer edges of the door with a veneer, wherein the edge banding is disposed across joints formed by the cope and pattern intersections.

34. The method of claim 33 wherein each member includes a profiled outer edge such that said edge banding comprises edge banding the profiled outer edges of the door.

35. The method of claim 33 wherein each member includes a pattern profiled inner edge, the method further comprising applying a veneer over the profiled inner edge.

36. The method of claim 35 wherein the applying the veneer is performed using a computer-controlled machine having a set of rollers attached at various locations and angles.

37. The method of claim 33 wherein the assembling step comprises affixing the two vertically-oriented members, the two horizontally-oriented members and the center panel using a glue.

38. The method of claim 37 wherein the assembling step does not include the use of staples.

39. A method of applying a veneer to a pattern profiled edge of a substrate, the method comprising:
forming a patterned profile on an edge of the substrate;
affixing a fleece-backed wood veneer to the edge of the substrate with an adhesive; and
applying pressure to adhere the veneer to the edge of the substrate.

40. The method of claim 39, further comprising removing any overages of veneer to conform to a shape of the pattern.

41. The method of claim 39, further comprising cutting the veneer at a non-right angle near an end of the edge.

42. The method of claim 41 wherein the non-right angle is a profiled angle.

43. The method of claim 39 wherein the forming the pattern profile, the affixing the veneer and the applying pressure are performed with a computer-controlled machine.

44. The method of claim 43 wherein the computer-controlled machine comprises computer-generated pattern profile data.

45. The method of claim 44 wherein the computer-controlled machine comprises a cylindrical type armature having rollers attached at various locations and angles, the roller designed to rotate and move along the pattern profile to apply pressure to conform the veneer to the pattern profile.

46. The method of claim 45 wherein the computer-controlled machine is selected from the group consisting of: a soft former, a double-end tennoner, an edge bander, and combinations thereof.

47. A veneered raised panel door comprising:
two vertically-oriented framing members;
two horizontally-oriented framing members disposed between the two vertically-oriented framing members to form a door frame, the door frame having an inner edge with a groove; and
a center panel disposed within the groove of the door frame;
wherein each exposed edge of the door is layered with an edge banding, the edge banding disposed across any joints between the vertically-oriented and horizontally oriented framing members.

48. The veneered raised panel door of claim 47 wherein the edge banding is a wood veneer.

49. The veneered raised panel door of claim 47, wherein the edge banding comprises a plastic material.

50. The veneered raised panel door of claim 47, wherein the edge banding comprises a solid wood material.

51. The veneered raised panel door of claim 47, wherein the edge banding has a thickness in a range of about 0.5 mm to about 19 mm.

52. A veneered raised panel door comprising:
two vertically-oriented framing members;
two horizontally-oriented framing members disposed between the two vertically-oriented framing members to form a door frame; and
a center panel disposed within the door frame;
wherein each exposed edge of the door is layered with an edge banding, the edge banding disposed across any joints between the vertically-oriented and horizontally oriented framing members, and
wherein each of the at least two vertically-oriented members and the at least two horizontally-oriented members comprise a pattern profile on an inside edge, wherein the pattern profile is covered with a veneer, and wherein the veneer covering the pattern profile includes a fleece backing.

53. The veneered raised panel door of claim 47 wherein the exposed edges of the door have a profile, and the edge banding is cut at a profiled angle to facilitate the banding of the profiled exposed edges of the door.

54. The veneered raised panel door of claim 47 wherein the two vertically-oriented members and the two horizontally-oriented members each include a substrate formed from an engineered core material.

55. The veneered raised panel door of claim 54 wherein the engineered core material is selected from the group consisting of medium density fiberboard (MDF), chip board, particleboard, plastic, and combinations thereof.

* * * * *

UNITED STATES PATENT AND TRADEMARK OFFICE
CERTIFICATE OF CORRECTION

PATENT NO.    : 6,487,827 B2
DATED         : December 3, 2002
INVENTOR(S)   : Hollman It is certified that error appears in the above-identified patent and that said Letters Patent is hereby corrected as shown below:

Column 1,
Line 44, delete "the.manufacturing" and substitute -- the manufacturing --.

Column 8,
Line 12, between "of" and "center" insert -- the --.
Line 26, delete "panels" and substitute -- panel, --.

Column 9,
Line 51, delete "let" and substitute -- least --.

Column 10,
Line 44, delete "patter" and substitute -- pattern --.
Line 55, delete "lest" and substitute -- least --.

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

| | |
|---|---|
| PATENT NO. | : 6,487,827 B2 |
| APPLICATION NO. | : 09/751969 |
| DATED | : December 3, 2002 |
| INVENTOR(S) | : Hollman |

It is certified that error appears in the above-identified patent and that said Letters Patent is hereby corrected as shown below:

Column 8, line 40; delete "surface" insert -- surfaces --
Column 8, line 42; delete "surface" insert -- surfaces --
Column 8, line 45; delete "surface" insert -- surfaces --
Column 8, line 48; delete "surface" insert -- surfaces --
Column 8, line 51; delete "surface" insert -- surfaces --
Column 8, line 54; delete "surface" insert -- surfaces --
Column 9, line 17; delete "surface" insert -- surfaces --
Column 9, line 20; delete "surface" insert -- surfaces --
Column 9, line 55; between "the" and "pattern" insert -- first --
Column 9, line 61; delete "vertically oriented" and insert -- vertically-oriented --
Column 9, line 63; delete "door"
Column 9, lines 64-65; delete "horizontally oriented" and insert
-- horizontally-oriented --
Column 10, line 4; delete the first occurrence of "the"
Column 10, line 18; delete "non-solid wood" and insert -- core --
Column 10, line 27; delete "vertically oriented" and insert -- vertically-oriented --
Column 10, line 29; between "with" and "veneer" insert -- a --
Column 11, line 3; delete "exposed"
Column 11, line 25; delete "vertically oriented" and insert -- vertically-oriented --
Column 11, line 29; delete "a" and insert -- the --
Column 11, line 30; delete the first occurrence of "the"
Column 11, line 65; delete "pattern" and insert -- patterned --
Column 12, line 7; delete "pattern" and insert -- patterned --
Column 12, line 8; delete "pattern" and insert -- patterned --
Column 12, lines 24-25; delete "horizontally oriented" and insert -- horizontally-oriented --
Column 12, lines 43-44; delete "horizontally oriented' and insert -- horizontally-oriented --

Signed and Sealed this

Twenty-fourth Day of July, 2007

JON W. DUDAS
*Director of the United States Patent and Trademark Office*